(No Model.)　　　　　　　　　　　　　　　　4 Sheets—Sheet 1.
F. P. BENJAMIN.
SIGNALING SYSTEM.
No. 461,810.　　　　　　　　　　Patented Oct. 27, 1891.
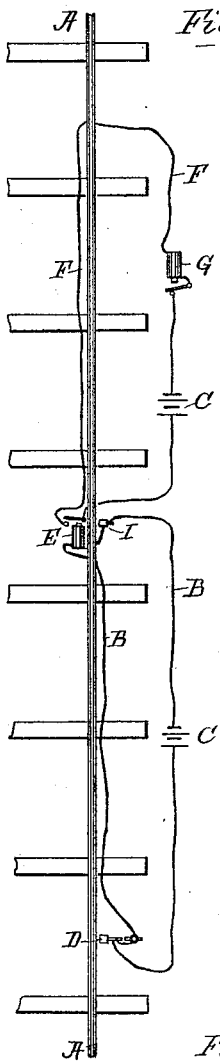
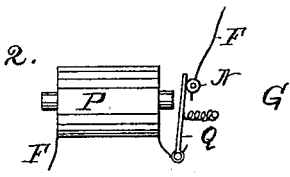
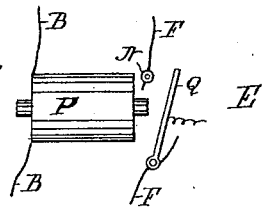
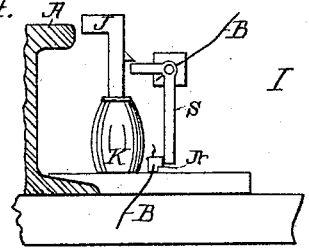
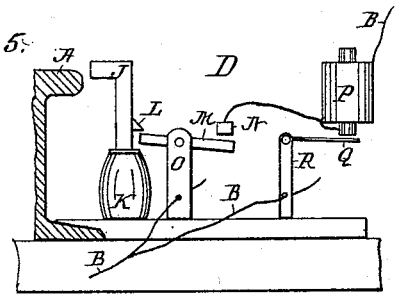
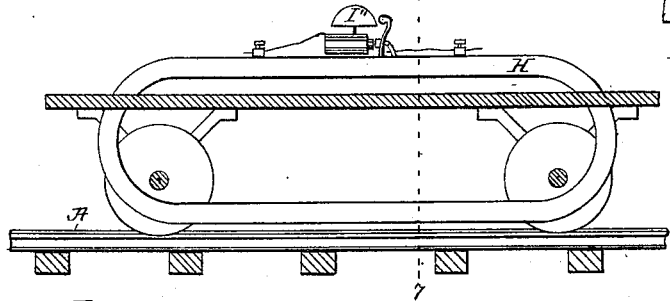
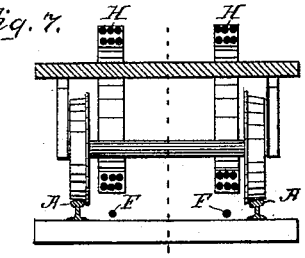
Witnesses:　　　　　　　　　　　　Inventor:
　　　　　　　　　　　　　　　Frank P. Benjamin (No Model.) 4 Sheets—Sheet 2.
F. P. BENJAMIN.
SIGNALING SYSTEM.
No. 461,810. Patented Oct. 27, 1891.
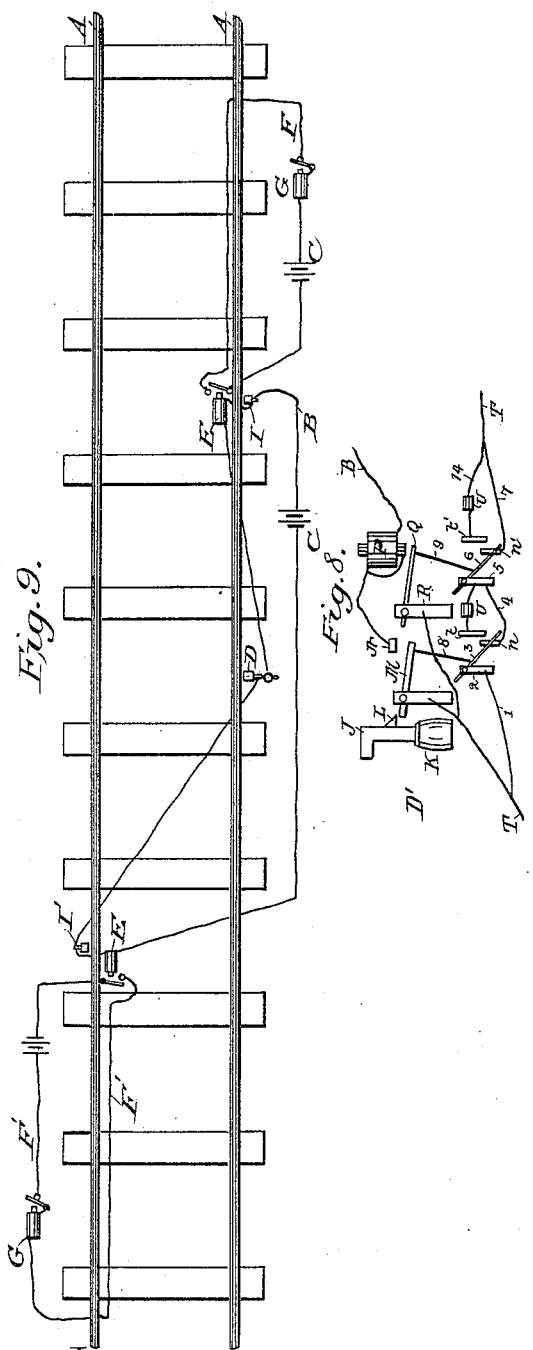
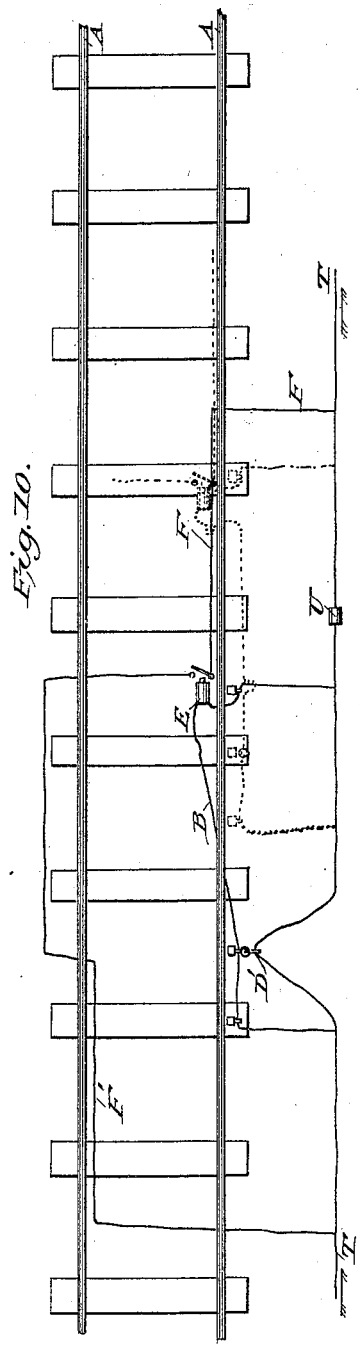
Witnesses:
Inventor:
Frank P. Benjamin (No Model.)
F. P. BENJAMIN.
SIGNALING SYSTEM.
No. 461,810.  Patented Oct. 27, 1891.
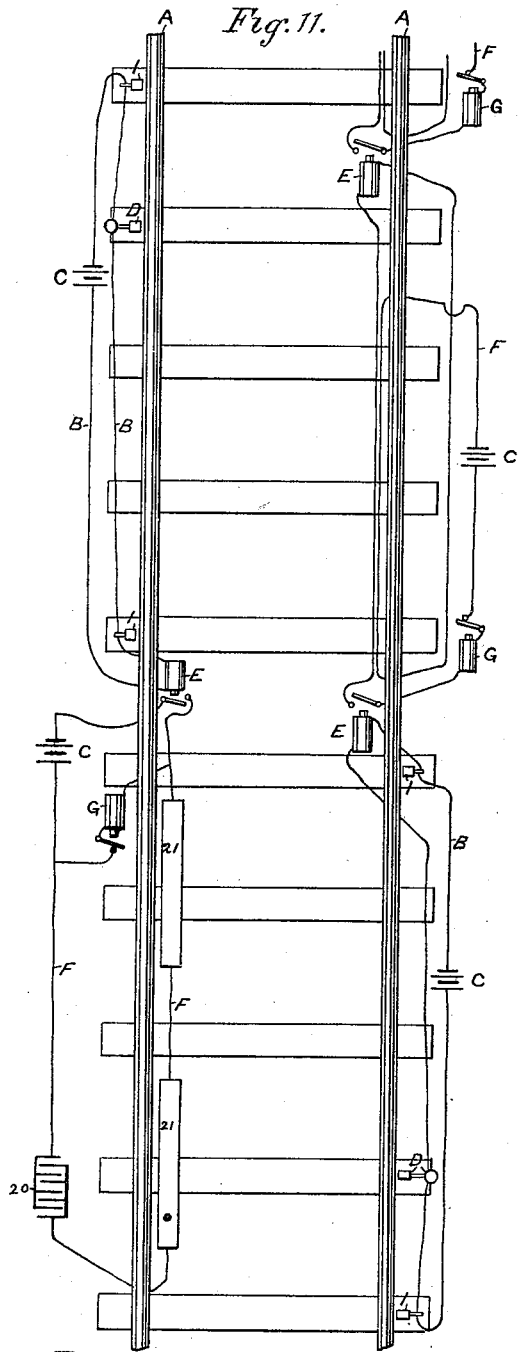
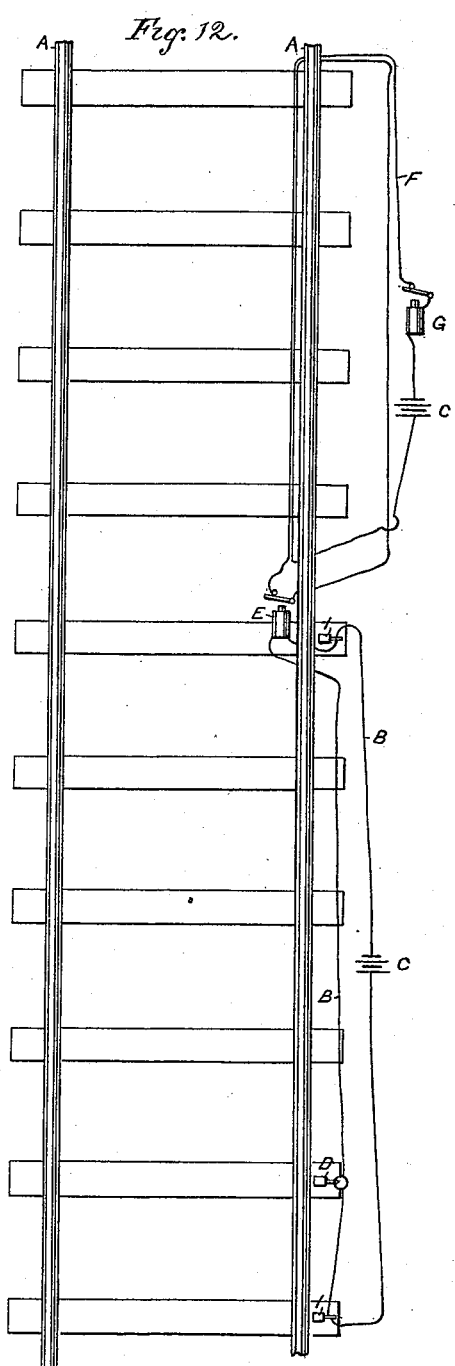

(No Model.) 4 Sheets—Sheet 4.
F. P. BENJAMIN.
SIGNALING SYSTEM.
No. 461,810. Patented Oct. 27, 1891.
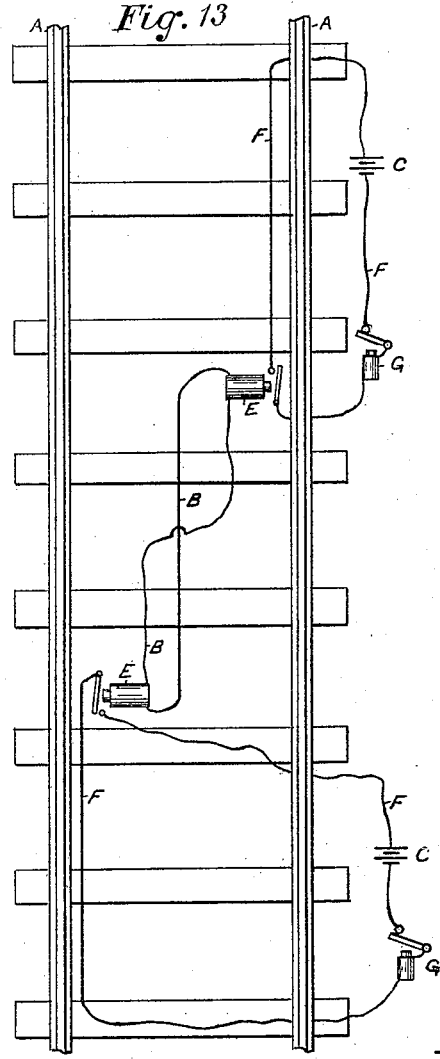
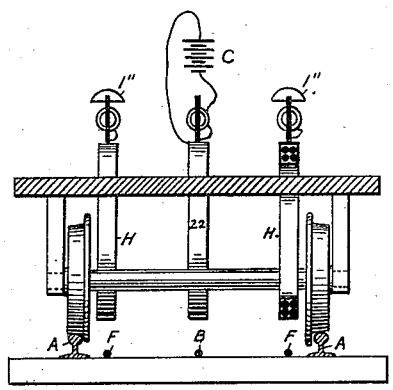
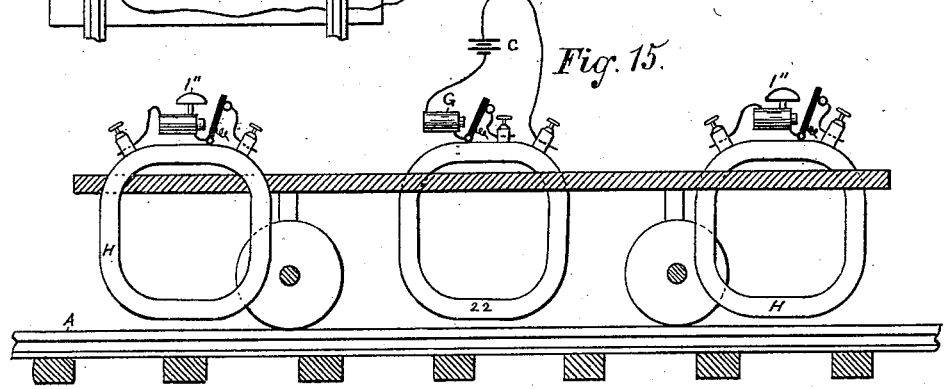
Witnesses:
W. Valentine
A. H. Cole
Inventor:
Frank P. Benjamin
THE NORRIS PETERS CO., PHOTO-LITHO., WASHINGTON, D. C.

UNITED STATES PATENT OFFICE.

FRANK P. BENJAMIN, OF NEW YORK, N. Y.

SIGNALING SYSTEM.

SPECIFICATION forming part of Letters Patent No. 461,810, dated October 27, 1891.

Application filed April 19, 1889. Serial No. 307,913. (No model.)

*To all whom it may concern:*

Be it known that I, FRANK P. BENJAMIN, a citizen of the United States, residing in the city, county, and State of New York, have invented certain new and useful Improvements in Signaling Systems; and I hereby declare that the following specification is in such full, clear, concise, and exact terms as will enable others skilled in the art to practice my invention in its preferred form, reference being had to the accompanying drawings, making part of this specification, and to the letters and figures of reference marked thereon.

Similar letters and numerals of reference indicate corresponding parts in all the figures.

My present invention consists of certain improvements in systems for signaling between trains by means of the inductive effects of currents of electricity, according to principles now well understood in the art.

In a patent granted to me March 12, 1889, I have described and claimed certain novel systems of electric signaling by means of induction, and my present invention is closely allied and related to the systems therein covered and contains some of the same substantial principles and characteristics.

Referring to the annexed drawings, Figure 1 illustrates a simple signaling system constructed according to the principles of my present invention. Figs. 2, 3, 4, 5, and 8 show in detail devices which may be included in said circuit and by means of which its operation is rendered automatic. Fig. 6 is a longitudinal section through a railway-vehicle, showing a signal-coil in elevation; and Fig. 7 is a cross-section through the same on the line 7 7, Fig. 6. Fig. 9 shows a signaling system of simple form arranged according to the plan of my present invention and designed to keep a warning-signal both ahead and behind the train. Fig. 10 is another form of a substantially similar system in duplicate. Figs. 11, 12, and 13 illustrate modified forms of signaling systems embodying my invention, and Figs. 14 and 15 show in detail devices which may be carried on the train to operate in connection with the circuits shown in Fig. 13.

The following is a description of the systems and automatic devices illustrated in the accompanying drawings, which show some of the forms in which my invention may be embodied and some of the devices capable of rendering the same practical; but it will be understood that my invention is not limited to the precise circuits and devices illustrated and described, as many modifications may obviously be made by those skilled in the art without departing from the spirit or scope of my invention.

The novel features of my invention, which I desire to secure by these Letters Patent, will be specifically pointed out in the claims concluding this specification.

Referring to Fig. 1, A A is a rail of a railway-track. B B is a circuit, to which is connected a suitable source of electric energy C. D is a circuit-making device which is closed by the passage of the train. E is a device by means of which the circuit F F is closed whenever a current flows through the circuit B. In the circuit F are included a suitable source of electric energy C and a vibrator or circuit-interrupter G. It is obvious that when by the passing of a train the primary circuit B is closed the current passing through it will close the secondary circuit F, through which a vibratory or an interrupted current will then flow.

Figs. 6 and 7 show a signal-receiving coil H, having an alarm I'', which will be sounded whenever the coil H is in inductive proximity to a circuit F in which a vibratory current is flowing. Such coils are so well known that a detailed description thereof is deemed unnecessary here. When the system is arranged on both sides of the track to signal both ahead and behind the train and the relation of the signaling and signaled train is to be indicated, such a coil should be arranged on each side of the vehicle, and as the alarm of one or the other sounds, the position of the signaling train, whether ahead or behind, will be thereby made known.

Referring to Figs. 2, 3, 4, and 5, Fig. 5 illustrates the device indicated in brief at D, Fig. 1, which, as I have said, is a circuit-making device to be operated by the passage of the train. J is an arm supported on a spring K, said arm being in the path of the wheels of the cars and being depressed by said wheels as they pass. As the arm J is depressed, the toe L, carried thereby, tilts the lever M into contact with the contact-piece N, thus causing a current to flow through the conductor B B by way of the standard O, lever M, contact-piece N, and coil of electro-magnet P. This current, passing around the coil of the electro-magnet P, attracts the arm Q and causes the current to flow through the conductor B B by way of the standard R, arm Q, and electro-magnet P. By the use of the devices illustrated in Fig. 5 I avoid the danger of the jar of the passing train breaking the circuit accidentally, as the electro-magnet P and the arm Q, by which the continuity of the circuit is maintained, may be placed at some distance from the road-bed, beyond injurious jarring effects, while the lever M is only relied on to make a temporary connection between the broken ends of the circuit to initiate the action of magnet P. When the armature Q is attracted, the circuit then flows through the coil of the magnet by way of such armature and the magnet continues its action as long as the armature Q maintains its elevated position.

Fig. 4 illustrates in detail the device shown at I, Fig. 1, and it consists of a bar J, supported on a spring K, identical with that illustrated in Fig. 5; but in this case the lever S is normally in contact with the contact-piece N to maintain the continuity of the circuit, and by the passage of the train and the depression of the bar J the lever S is momentarily withdrawn from its contact with the contact-piece N, thus breaking the circuit and causing the electro-magnet P, Fig. 5, to let go the armature Q, which then falls into its normal position, as illustrated, and the circuit remains disrupted until, by the passage of another train, the electro-magnet is again brought into action.

The device indicated by the reference-letter E, Fig. 1, is illustrated in detail in Fig. 3. Whenever a current flows through the circuit B B around the coil of this electro-magnet P, the armature Q is attracted and brought into contact with the contact-piece N, and thus the circuit F F is made through the armature Q. Instead of the magnet, a solenoid or any other suitable device which will be effected by the current in one circuit to govern the current in the other may of course be substituted.

The circuit-interrupting device illustrated at G, Fig. 1, is shown in detail at Fig. 2. This consists of an ordinary circuit-vibrator, by means of which the armature Q is kept vibrating between the contact-piece N and the armature of the electro-magnet, because whenever the armature approaches the magnet it breaks the circuit and is then drawn into contact with the contact-piece N, and whenever the said armature comes in contact with the contact-piece N it makes and energizes the magnet, which then draws it away from its contact with the contact-piece N. Hence it will be seen that by the circuits indicated in Fig. 1, while a train is between the contact-make device D and the contact-break device I, a vibratory current will be caused to flow through the circuit F F, which will operate the alarm I'' on any train that happens to be at the same time over the circuit F F.

Referring to Fig. 9, the same parts and combinations of parts shown in Fig. 1 are here illustrated, but in addition there is shown a circuit F' F' in all respects similar to the circuit F F and containing the same devices, and without further description it will be obvious that when a train is passing between the make device D and the break device I a warning-signal will be transmitted behind as well as in front of it. I have also shown in this figure a second break device I', so that if a train be passing in a direction toward the bottom of the sheet it will, having made the circuit at D, break it at I', and if the train be running toward the top of the drawing, having made the circuit at D, it will break it at I.

Referring to Fig. 10, I have here illustrated one of the various modifications of which my present invention is capable, and it consists of having a single circuit for transmitting the signals both ahead and behind the train, which circuit in said figure is indicated by the letters F F F' F'. This avoids the necessity for the second circuit-closing device E behind the train. Instead of showing the circuits B B and F F, supplied by different sources of electricity, I have shown a conductor T T, which supplies both. If a dynamo without a commutator, for instance, be employed, the necessity for the interrupter G is avoided. For the purpose of diverting the necessary portion of the current through the make device D and the local circuits, resistances, one of which is indicated at U, may be placed at any suitable points. Such a device as that which is illustrated in Fig. 8 may be employed to divert the required current into the shunt or shunts, by means of which the resistance is introduced only at such times and at such points as it is required for the operation of the system. This device D' (see Fig. 8) consists of an arm J, supported on a spring K, carrying the toe L, which tilts the lever M when the train passes, as has been heretofore described. The current normally passes from the conductor T to conductor 1, to standard 2, to bar 3, to contact-piece $n$, to conductor 4, to standard 5, to bar 6, to contact-piece $n'$, to conductor 7, and so on through the circuit T. When the lever M is raised into contact with the contact-piece N, the link 8, connecting lever M and bar 3, lifts the bar 3 off the contact-piece $n$ against the contact-piece $t$, which is connected with the standard 5 by a conductor carrying a resistance U, so that when the lever M is raised a resistance is introduced into the circuit T to divert the proper position of its current into the circuit B. In like manner, when the electro-magnet P is energized by the current sent through it when lever M is raised it will attract the lever Q, which is connected with the lever 6 by a link 9, and will raise the lever 6 from its contact with the contact-piece $n'$ into contact with the contact-piece $t'$, through which, by means of a conductor 14, carrying a resistance U, connection is made with T. Hence whenever the lever M or the lever Q is raised, closing the circuit B, a resistance is introduced in conductor T, which diverts the required current into conductor B. The links 8 and 9, connecting rods M to 3 and Q to 6, are of non-conducting material. The contact-pieces $n$ and $t$ and $n'$ and $t'$ do not touch each other, but are lapped so that the circuit through conductor T is never broken. In Fig. 10 I have also shown by dotted lines parts of a second system like that described, a further description of which is unnecessary.

My system is of course capable of being worked by the principles of static induction or by the introduction of current into the circuit B B by means of induction from the signaling-train or by any other suitable means.

Fig. 11 illustrates the system hereinbefore referred to worked by static induction. Referring to the circuits and devices illustrated on the left-hand side of said figure, the circuit B B, with its battery C, its electro-magnet E, its circuit-making device D, and its circuit-breaking device I I are substantially like those heretofore described. The signaling-circuit F F is, however, provided with a plate or plates 21, adapted to be charged statically. In said circuit C is a battery generating a continuous current. In a shunt across the circuit F F a vibrator G is placed. Any equivalent means of obtaining a current which will work the signaling devices on the train by induction may be employed. 20 is a condenser placed in the circuit F F. When the armature of the electro-magnet E is by attraction brought into contact with the core, the circuit F F is closed and the armature of the vibrator G is attracted into contact with the core of its magnet. This disrupts the current through the coils of the magnet and causes the current to flow to the condenser and thus charge statically the plates 21. The circuit through the coils of the electro-magnet G is then again closed. These operations are repeated again and again by the vibrations of the armature of the vibrator, as is now well understood in the arts. The static charge in the plates 21 will by induction operate the signal on a train in inductive relation thereto, according to well-known principles.

Figs. 13, 14, and 15 illustrate the introduction of a current into the circuit B B by means of induction from the signaling-train. Referring to Fig. 13, it will be seen that the circuit B B is laid along the center of the track and contains the coils of the electro-magnets E E. On the train, as shown by Figs. 14 and 15, there is a coil placed in inductive relation to this circuit B B on the track, which coil is indicated by the reference-figures 22. In the circuit of the coil 22 is introduced a suitable source of electric energy C, constantly flowing through said coil and a circuit-vibrator G. When this signaling-coil is over the circuit B B in the center of the track, it will cause a current by induction to flow through said circuit B B, which will attract the armatures of the electro-magnets E E and close the circuits F F F' F', each of which is provided with a battery C and a vibrator G. This will cause a signaling-current to be maintained both ahead and behind the train. H H are the signal-receiving coils, one on each side of the car. I" I" are the alarms connected with said coils.

If the current flowing through the circuit B B (see Figs. 1 and 9) be continuous, the conductors may be in inductive relation to the signaling-coils on the train; but if the circuit B B is traversed by a vibratory current it must be maintained out of inductive relation to the signal-receiving coils, although if it receives energy from the train by induction it should then be in inductive relation to signal-transmitting coils on the train, all according to the principles now well understood. Instead of having the circuits B B normally open, as shown, it may be normally closed, in which case the circuit-closer E of the circuit F should be so arranged that when the armature is withdrawn from contact with its electro-magnet it closes the circuit F, and while it is in contact with the electro-magnet it maintains said circuit F open. Such arrangement is shown in Fig. 12, in which the signaling-circuit is arranged in a coil to heighten inductive effects. Again, of course the approach of a train might be indicated by the silence of the signaling-instruments, in which case a clear track would be indicated by the continual sounding of the instrument or the operation of other signals, or the alarm might be arranged to sound when the circuit with which its coil is in inductive proximity is open and to remain silent when it is closed and the current is flowing.

Various other modifications may be made, as such do not affect the principles of my invention broadly considered.

Having thus described my invention, what I claim, and desire to secure by Letters Patent, is—

1. In a system of railroad signaling in which communication between trains is automatically established by means of the inductive effects of a current of electricity, the combination of a circuit closed by a train entering a signal-section, a vehicle carrying a conductor with signaling-instruments, said conductor being adapted to receive electrical impulses by induction, a second circuit parallel to and in inductive relation to said vehicle-conductor, and mechanism, substantially as described, operated by the current in said first circuit to intermittently cause a current to flow through said second circuit.

2. In a system of railroad signaling in which communication between trains is automatically established by means of the inductive effects of a current of electricity, the combination of a circuit containing make and break devices in the path of a moving vehicle, an electrical generator, the current from which is automatically cut into and out of such circuit by said make and break devices, a vehicle carrying a conductor with signaling-instruments, said conductor being adapted to receive electrical impulses by induction, a second circuit parallel to and in inductive relation to said vehicle-conductor, and mechanism, substantially as described, operated by the current in said first circuit to intermittently cause a current to flow through said second circuit.

3. In a system of railroad signaling in which communication between trains is established by means of the inductive effects of a current of electricity, the combination of a vehicle having a conductor, including signal-receiving instruments, a circuit containing a circuit-controller operated by a passing train, and a second circuit arranged along the track in inductive relation to said signaling-conductor, mechanism, substantially as described, operated by the current in said first circuit to intermittently cause a current to flow through said second circuit, and an electrical generator, substantially as described.

4. In a system of railroad signaling in which communication is established between vehicles by means of the inductive effects of a current of electricity, the combination of a vehicle having a plurality of conductors, each including instruments for receiving signals, a circuit B, a plurality of local circuits arranged on both sides of the track parallel to and in inductive relation to said vehicle-conductors, respectively, mechanism, substantially as described, operated by the current in said first circuit to intermittently cause a current to flow through said second circuit, and an electric generator, substantially as described.

5. In a system of railroad signaling in which communication between trains is established by means of the inductive effects of a current of electricity, the combination of a vehicle carrying a conductor with signaling-instruments, a circuit B, a plurality of separate and independent local second circuits arranged along the line in inductive relation to said vehicle-conductor, said local circuits being overlapped, and mechanism, substantially as described, operated by the current in said first circuit to intermittently cause a current to flow through said second circuit, substantially as described.

6. In a system of railroad signaling in which communication between trains is established by means of the inductive effects of a current of electricity, the combination of a vehicle having a plurality of conductors, each including signaling-instruments, a circuit B, a plurality of local second circuits overlapped and arranged on both sides of the track in inductive relation to said vehicle-conductor, respectively, and mechanism, substantially as described, operated by the current in said first circuit to intermittently cause a current to flow through said second circuit, substantially as described.

FRANK P. BENJAMIN.

Witnesses:
J. EDGAR BULL,
WM. M. VALENTINE.